Patented Apr. 9, 1940

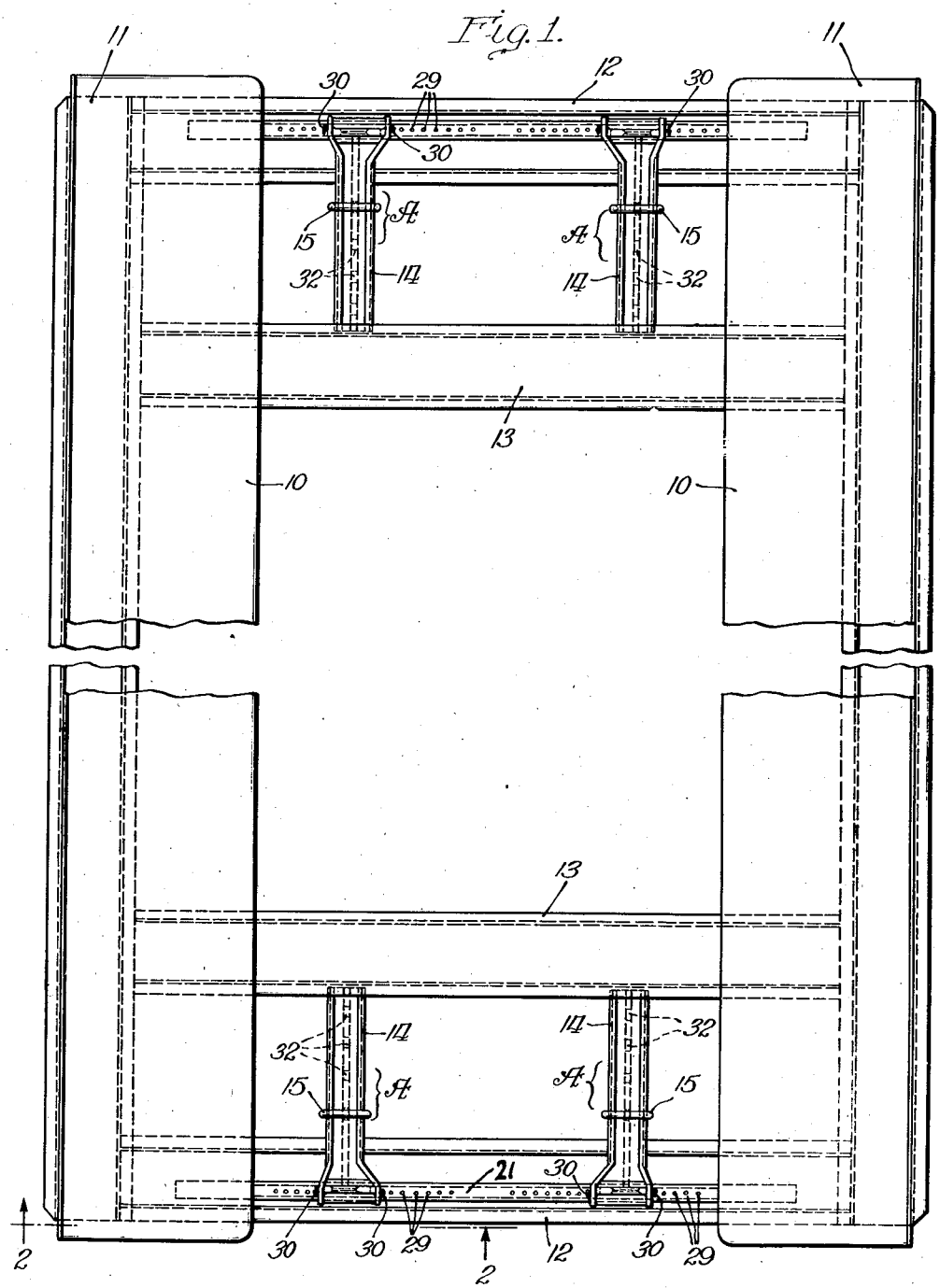

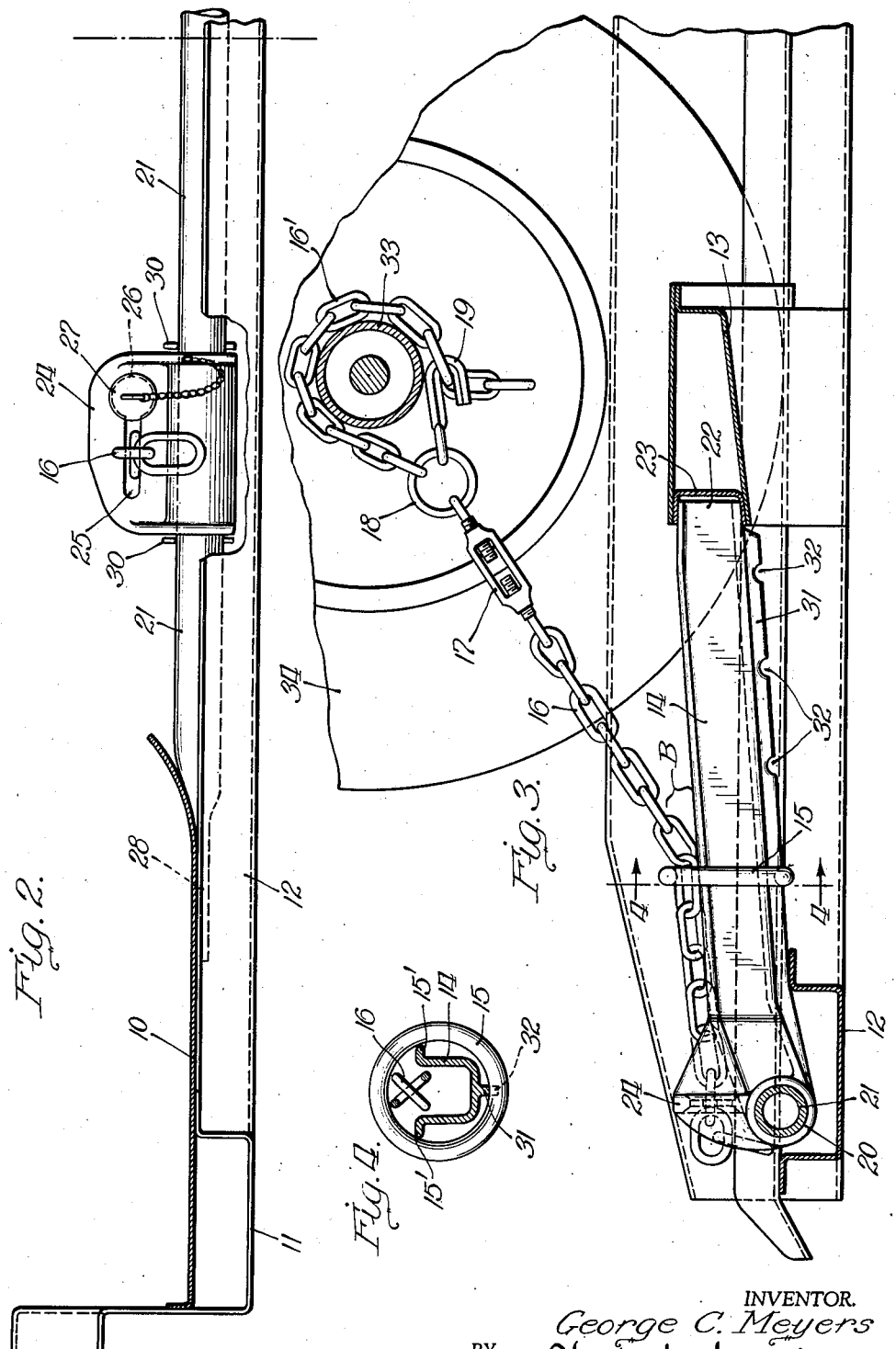

2,196,504

UNITED STATES PATENT OFFICE 2,196,504

ADJUSTABLE TIE-DOWN

George C. Meyers, Michigan City, Ind.

Application May 20, 1938, Serial No. 209,018

10 Claims. (Cl. 105—368)

My invention relates to car loading devices known as tie-downs or hold-downs which are employed in anchoring an automobile or other wheeled vehicle to a deck or rack on which the vehicle is supported for transportation in a freight car.

In loading automobiles for shipment in freight cars it is common practice to support two automobiles upon the floor of the car and to support an elevated automobile upon a deck over each of the floor supported vehicles. The deck supported automobile is securely fastened to the deck by means of chains or other flexible members, known as tie-downs, which are carried by or anchored to the deck and suitably attached to the wheeled vehicle.

In the transportation of some vehicles it is desired that the flexible tie-down member be attached to the car axle; on others, to points on the vehicle underframe; on other makes of vehicles it is desirable to fix a bracket at some point on the vehicle underframe, and attach the flexible tie-down member to this bracket.

The principal object of my invention is to provide a deck having tie-down assemblies which are adjustable so that they can be moved to the desired position for attachment of the flexible members to desired points on vehicles of varying size and manufacture for properly anchoring the vehicles to the deck and preventing movement in any direction of the vehicle on the deck.

Another object of my invention is to provide tie-down assemblies adjacent the four wheels of the deck supported vehicle, which can be adjusted transversely of the deck to desired positions.

A further object of my invention is to provide adjustable tie-down assemblies having means for adjusting the angularity of the chain or flexible member that is anchored at one end and attached to the vehicle at the opposite end.

Other objects of the invention will become apparent from the following description, and the drawings relating thereto.

Referring to the drawings:

Figure 1 is a plan view of a deck for supporting a vehicle in a freight car, having adjustable tie-down assemblies thereon, the middle portion of the deck being omitted as indicated by broken lines.

Figure 2 is an end view of a portion of the deck, taken on the line 2—2 of Fig. 1.

Figure 3 is an enlarged side view, partly in section, of one of the adjustable tie-down assemblies showing the flexible member or chain of the tie-down assembly attached to the axle of a wheeled vehicle that is carried on the deck.

Figure 4 is a sectional view taken on the line 4—4 of Fig. 3.

Similar reference numerals and letters refer to similar parts throughout the drawings.

As shown in Fig. 1, the deck comprises spaced longitudinally disposed wheel supporting runways 10, longitudinal side members 11, end transversely disposed members 12 and intermediate transverse members 13, suitably spaced from the end transverse members 12. The deck carries four adjustable tie-down assemblies, each of which is designated generally by the letter A.

Two of the adjustable tie-down assemblies are located adjacent each end of the deck, and as each of the tie-down assemblies are identical, description of one is deemed sufficient.

The adjustable tie-down assembly comprises a longitudinally disposed transversely adjustable base member 14, a longitudinally adjustable loop 15 and a chain or other suitable flexible member which includes the lower chain portion 16, an intermediate turnbuckle 17, with an enlarged link 18 secured to one end and a chain extension 16' and hook member 19 attached to the enlarged link 18.

Referring particularly to Fig. 3 of the drawings, it is seen that the base member 14 has at one end, 20, a circular opening through which passes a pipe member 21, the base member 14 being movable on the pipe member after the parts are assembled, as will be more fully described hereinafter. The opposite end of the base member 14, indicated by the numeral 22, fits snugly within the channel 23 formed on the side of the intermediate transverse member 13, and is slidable thereon transversely of the deck. One end of the base member 14 carries an upright vertical extension 24 having a slot 25 which is parallel to the end transverse member 12 as shown in Fig. 2 of the drawings. This slot has an enlarged circular opening 26 at one end which can be closed by the plug 27 after the chain 16 is inserted in the enlarged end of the slot and a link of the chain is moved into the restricted portion of the slot so as to lock the chain 16 in the slot 25, the links adjoining the link in the slot being perpendicular to the slot, whereby the chain is locked in the slot. The plug 27 prevents the chain from slipping out of locked position. Loss of this plug is prevented by its attachment to the vertical extension 24 by means of a small chain as clearly shown in Fig. 2.

In placing the tie-down assembly on the deck, the loop 15 is passed over the end 22 of the base 14. The end 20 of the base 14 is then placed over the pipe member 21, the pipe member passing through the circular opening at the end 20 of the base member, and the flattened ends 28 of the pipe member 21 are then welded or suitably attached to the deck, for example, to the bottom of the longitudinal runways 10 of the deck as shown at 28 in Fig. 2, the ends 22 of the base member being placed in the channel 23 of the transverse member 13 prior to the permanent attachment of the pipe member 21 to the deck. The base member is then slidable or adjustable transversely of the deck, the ends being movable along the pipe 21 and the channel 23. For holding the base member in the desired fixed position transversely of the deck, as shown in Fig. 1, the pipe member 21 is provided with a plurality of small openings 29 and locking pins 30 are insertable in these openings on opposite sides of the end 20 of the base member for fixing the base member 14 at the desired point transversely of the deck.

In securing vehicles to decks for transportation, it is desirable that the flexible tie-down member or chain attached to the vehicle and the base member be at the proper angle for exerting a downward pull in securing the vehicle on the deck. With my improved tie-down assembly, any desired angularity can be obtained in loading vehicles of varying size and manufacture by means of the longitudinally movable loop 15 that is carried on the base member 14 of the tie-down assembly.

As clearly shown in Figs. 2 and 3 the chain 16 is anchored in the slot 25 and passes through the loop 15 which is fixed at the desired point longitudinally of the base member, as will be more fully described hereinafter. From the loop 15, the flexible member comprising the lower chain 16, the turnbuckle 17 and the chain extension 16' extends upwardly to the point of attachment to the vehicle. The position of the loop 15, longitudinally of the base member regulates the angle indicated by the leter B in Fig. 3. The loop can be positioned at the desired point whereby the chain or flexible member exerts the desired downward pull when attached to the vehicle.

Referring to Fig. 4 of the drawings, it is shown that the base member 14 is of a general U-shape, having horizontally disposed outwardly extending flanges 15' at the upper end of the U, and a vertically disposed depending flange 31 at the bottom of the U having at desired points a plurality of notches 32 in which the loop 15 is held fixed when the flexible chain 16 is secured to a vehicle.

In operation, the vehicle is placed on the deck, and the tie-down assemblies are moved to the desired position transversely of the deck, this position depending upon the size of the vehicle and the points at which the flexible members are to be attached. The end of the chain 16 is locked in the slot 25 by means of the plug 27, the chain passing through the loop 15 as shown in Fig. 4. The chain extension 16' is passed over the axle or other desired point on the vehicle. As shown in Fig. 3, the chain is passed over the axle 33 of the vehicle having a wheel 34 and is attached to the hook 19. The turnbuckle 17 is turned to take up slack in the chain, the loop 15 being placed in the desired notch 32 on the under side of base member 14; the notch selected depending upon the length of the vehicle and the desired angle indicated by the letter B in Fig. 3 of the drawings. As shown in Fig. 4, when the chain or flexible member of the tie-down assembly is secured to the vehicle, the chain contacts the upper portion of the loop 15 and tends to hold the bottom of the loop in the notch 32 in which it is placed. This prevents the loop 15 from slipping out of the desired notch.

In the use of my invention a plurality of adjustable tie-down assemblies are placed at suitable points on a deck for supporting a wheeled vehicle for transportation. Each tie-down assembly is adjustable transversely of the deck and has means for holding it at the desired point transversely of the deck. My adjustable tie-down assembly includes means for fixing a chain or flexible member thereto and a longitudinally adjustable member for controlling the angle at which the chain extends upwardly from the deck to the point of attachment to the vehicle.

It will be seen from the foregoing that my adjustable tie-down provides a relatively simple and inexpensive means for securing a vehicle to a deck or rack. It possesses great flexibility and is adapted to fasten vehicles of varying size and manufacture to a deck. The adjustability of my tie-down assembly enables it to be properly positioned with relation to the point on the vehicle to which the flexible member is attached, and also enables the angularity of the flexible member to be controlled to the desired degree, regardless of the wheel base of the vehicle or the point on the vehicle to which the flexible member is secured.

Although only one form of my invention has been illustrated and described in detail, it will be apparent to those skilled in the art that my adjustable tie-down assembly could be used to anchor a floor supported vehicle and that various modifications may be made without departing from the scope of the appended claims.

I claim:

1. A deck for supporting vehicles having a tie-down assembly slidably mounted on spaced transverse members of the deck, said assembly being slidable longitudinally of said spaced transverse members, the tie-down assembly including a flexible member and a loop member secured to the deck through which the flexible member passes, said loop member being adjustable longitudinally of the deck and adapted to control the angle at which the flexible member extends from the deck to the vehicle.

2. A tie-down assembly comprising a flexible member anchored to a deck at one end and attached to a vehicle at the opposite end and a loop through which the flexible member passes, said loop being adjustably mounted on a base member disposed longitudinally of the deck whereby the loop is adjustable of the deck, the under side of said base member being provided with a plurality of spaced notches with any one of which the loop cooperates so as to control the angle at which the flexible member extends from the deck to the point of attachment on the vehicle, the ends of said base member being secured against vertical movement relative to the deck.

3. An adjustable tie-down assembly for a vehicle supporting deck, including a base member having longitudinally spaced notches, said base member being adjustable transversely of the deck and secured against vertical movement relative to said deck, and said notches adapted to cooperate with a movable loop mounted on the base member said loop being adjustable longitudinally of the deck and a flexible member anchored to the base member at one end and secured to the vehicle at the other end, an intermediate portion of said flexible member passing through and contacting the loop.

4. An adjustable tie-down assembly mounted on a vehicle supporting deck including a base member movable transversely of the deck and held against vertical movement relative to said deck, said base member having longitudinally spaced notches on its under side, a movable loop mounted on the base member cooperating with any one of the notches and a flexible member anchored to the base member at one end, passing through the loop and extending upwardly to a point of anchorage on the vehicle.

5. An adjustable tie-down assembly mounted on a vehicle supporting deck including a base member adjustable transversely of the deck and secured against vertical movement relative to said deck, means for securing said base member at the desired position transversely of the deck, said base member having longitudinally spaced notches on its under side, a movable loop mounted on the base member cooperating with one of the notches and a flexible member anchored to the base member at one end, passing through the loop and extending upwardly to a point of anchorage on the vehicle, the movable loop being adapted to control the angle at which the flexible member extends upwardly from the base member.

6. An adjustable tie-down assembly for a vehicle supporting deck including a base member which is mounted on transversely disposed members of the deck and adjustable transversely of the deck, means for securing said base member against vertical and longitudinal movement relative to the deck at the desired point transversely of the deck, a movable loop mounted on the base member said loop being adjustable longitudinally of the deck, points of anchorage for the loop on the under side of the base member and a flexible member attached to a vertical extension at one end of the base member, the flexible member passing through said loop and extending upwardly to a point of attachment to the vehicle.

7. An adjustable tie-down assembly for a vehicle supporting deck including a base member providing a point of anchorage for one end of a flexible tie-down member, said base member being adjustable transversely of the deck and secured against vertical movement relative to said deck, a loop mounted on said base member through which loop the flexible member passes, said loop being adjustable on said base member longitudinally of the deck.

8. A vehicle supporting deck having an adjustable tie-down member including a base member adjustable transversely of the deck, a flexible member attached to the base member at one end and attached to a vehicle at the opposite end, a loop mounted on said base member through which the flexible member passes said loop being adjustable longitudinally of the deck, a plurality of spaced notches on the under side of said base member, said notches providing points of anchorage for said loop whereby the loop can be so positioned as to control the angle at which the flexible member extends from the deck to the point of anchorage on the vehicle said base member being secured against vertical movement relative to said deck.

9. A vehicle supporting deck provided with a plurality of tie-down assemblies which are adjustable transversely of the deck and secured against vertical movement relative to said deck, means for securing each of said tie-down assemblies at the desired point transversely of the deck, each of the tie-down assemblies including a flexible member, a base member, and a loop mounted on said base member, one end of the flexible member being anchored to the base member, said flexible member passing through said loop and extending from the loop to the point of attachment to the vehicle.

10. An adjustable tie-down assembly for a vehicle supporting deck including a base member providing a point of anchorage for one end of a flexible tie-down member, said base member being adjustable transversely of the deck and secured against vertical movement relative to said deck, and a loop mounted on the base member through which loop the flexible member passes said loop being adjustable longitudinally of the deck, the flexible member contacting said loop and extending upwardly from this point of contact to the point of attachment to the vehicle.

GEORGE C. MEYERS.